United States Patent
Seiffert et al.

(10) Patent No.: US 10,436,146 B2
(45) Date of Patent: Oct. 8, 2019

(54) PISTON FOR AN INTERNAL COMBUSTION ENGINE AND METHOD FOR PRODUCING THE PISTON FOR AN INTERNAL COMBUSTION ENGINE

(71) Applicant: FEDERAL-MOGUL NURNBERG GMBH, Nuremberg (DE)

(72) Inventors: Michael Seiffert, Nuremberg (DE); Hanno Necker, Nuremberg (DE); Georg Hopp, Nuremberg (DE)

(73) Assignee: Federal-Mogul Nurnberg GmbH, Nuremberg (DE)

( * ) Notice: Subject to any disclaimer, the term of this patent is extended or adjusted under 35 U.S.C. 154(b) by 0 days.

(21) Appl. No.: 15/546,339

(22) PCT Filed: Jan. 26, 2016

(86) PCT No.: PCT/EP2016/051523
§ 371 (c)(1),
(2) Date: Jul. 26, 2017

(87) PCT Pub. No.: WO2016/120246
PCT Pub. Date: Aug. 4, 2016

(65) Prior Publication Data
US 2018/0202388 A1    Jul. 19, 2018

(30) Foreign Application Priority Data

Jan. 30, 2015  (DE) .................. 10 2015 201 633

(51) Int. Cl.
*F02F 3/00* (2006.01)
*F02F 3/02* (2006.01)
*F16J 1/18* (2006.01)

(52) U.S. Cl.
CPC .......... *F02F 3/0076* (2013.01); *F02F 3/0084* (2013.01); *F02F 3/02* (2013.01); *F16J 1/18* (2013.01); *F02F 2200/00* (2013.01)

(58) Field of Classification Search
CPC ...... F02F 3/0076; F02F 3/0084; F02F 3/0092; F02F 2200/00; F02F 2200/06;
(Continued)

(56) References Cited

U.S. PATENT DOCUMENTS

| 2,195,552 A | 4/1940 | Alexandrescu |
| 2001/0029840 A1 | 10/2001 | Gaiser et al. |

(Continued)

FOREIGN PATENT DOCUMENTS

| DE | 1021203 B | 12/1957 |
| DE | 3418454 A1 | 12/1985 |

(Continued)

OTHER PUBLICATIONS

International Search Report, dated Apr. 1, 2016 (PCT/EP2016/051523).

*Primary Examiner* — Jacob M Amick
(74) *Attorney, Agent, or Firm* — Robert L. Stearns; Dickinson Wright, PLLC

(57) ABSTRACT

A steel piston (10) for an internal combustion engine comprises a ring zone (12), a shaft (14), openings (16) between the ring zone (12) and shaft (14) which extend from the piston outer side to the piston inner side, and, between two openings (16), a rib (18) which is substantially central with respect to a length of a piston pin to be received, wherein, when viewed in the circumferential direction, the rib (16) has a decreasing thickness from the middle thereof, as measured in the radial direction. In a method for producing a steel piston for an internal combustion engine comprising a ring zone and a shaft, openings are formed between the ring groove region and the shaft which extend from the piston outer side to the piston inner side, and at least one rib is formed between the openings which is substantially central with respect to a length of a piston pin to be received, wherein, when viewed in the circumferential direction, the rib (16) has a decreasing thickness from the middle thereof, as measured in the radial direction.

8 Claims, 1 Drawing Sheet

(58) Field of Classification Search
CPC ......... F02F 2200/08; F02F 3/02; F02F 3/027; F16J 1/18
See application file for complete search history.

(56) References Cited

U.S. PATENT DOCUMENTS

2009/0056534 A1    3/2009  Scharp
2011/0154984 A1*  6/2011  De Oliveira ............ F02F 3/003
                                                   92/172
2012/0174770 A1*  7/2012  Ramm .................... B25B 27/20
                                                   92/256

FOREIGN PATENT DOCUMENTS

| DE | 102004013905 A1 | | 10/2005 | |
|---|---|---|---|---|
| DE | 102006013905 A1 | | 9/2007 | |
| DE | 102015201633 A1 | | 8/2016 | |
| FR | 375308 A | | 7/1907 | |
| FR | 822409 A | | 12/1937 | |
| FR | 988910 A | | 9/1951 | |
| GB | 190487 A | * | 3/1924 | ............ F02F 3/0076 |
| JP | S5899555 U | | 7/1983 | |
| JP | 2010038048 A | | 2/2010 | |
| JP | 2013015080 A | | 1/2013 | |

* cited by examiner

PISTON FOR AN INTERNAL COMBUSTION ENGINE AND METHOD FOR PRODUCING THE PISTON FOR AN INTERNAL COMBUSTION ENGINE

BACKGROUND

1. Technical Field

The invention relates to a piston for an internal combustion engine and a method for producing a piston for an internal combustion engine.

Typically, conflicting demands are placed upon pistons for internal combustion engines, resulting in a trade-off. On the one hand, the piston is required to be comparatively light while, on the other, it must be rigid enough and strong enough to meet the demands made upon it in operation.

2. Related Art

A steel piston that has an opening between a ring zone and a shaft is known, for example, from US 2001/0029840 A1.

JP 2010-038048 A relates to a piston with a ring zone and a shaft, said shaft being of a considerably smaller height along the piston axis than the ring zone and, in an exemplary embodiment, being supported by two reinforcements extending substantially parallel to the piston axis towards the ring zone.

DE 10 2004 013 905 A1 relates to a piston for an internal combustion engine, which is provided on its internal wall with at least one reinforcing rib running parallel to the central axis of the piston, wherein an opening can be provided on either side of said reinforcing rib.

SUMMARY

Given this background, the problem addressed by the invention is to provide a piston for an internal combustion engine that fulfils in equal measure the requirements for weight saving, on the one hand, and strength, on the other.

This problem is solved by the piston described in claim 1. According to this, said piston comprises a ring zone, a shaft, openings between the ring zone and shaft, which extend from the piston outer side to the piston inner side, and at least one rib between two openings, said rib being substantially central with respect to a length of a piston to be received. The ring zone is understood to be the region adjacent to the piston base, in which one or more piston ring grooves are located. The shaft substantially represents that region of the piston at which the piston is in sliding contact with the walls of a cylinder or a cylinder liner. Normally, the shaft is formed by two separate shaft walls, situated on either side of the piston pin hubs. The shaft walls are attached to the piston pin hubs by means of so-called connecting walls.

According to the invention, the described openings advantageously serve to save weight. At the same time, the central rib produces the necessary strength. The rib or strut therefore advantageously reinforces the central shaft region and prevents the ring zone from bending down. This reinforcement reduces the elastic incursion of the shaft, thereby creating a largely homogenous contact pattern in the region of the piston shaft and reducing tilting of the piston in operation. This further prevents the cylinder head from striking against the cylinder wall, thereby also advantageously reducing noise. It should be added that precisely two openings and one single rib are preferably provided at each side of the piston pin.

It has proved to be beneficial in terms of strength and also to simultaneously bring the design of the rib in line with the objective of weight-saving, for said rib, when viewed in the circumferential direction, to have a decreasing thickness from the middle thereof, as measured in the radial direction of the piston.

Preferred developments of the piston according to the invention are described in the further claims.

It is advantageous in terms of weight saving and it has further been found that the necessary strength can be achieved, if at least one opening exhibits more than double the width of the rib in the circumferential direction.

For guidance of the piston and strength in the region of the shaft, it is preferred that the shaft, in particular the individual shaft walls, exhibit at least 1.5× the height of the ring zone along the piston axis.

In order to achieve a configuration that is as crack resistant as possible under maximum loading, it is preferable that the rib and/or the region adjacent to at least one opening is designed with a concave curvature on the outer side in a section that contains the piston axis. Since the opening is formed by forming a groove, for example, such a groove formed from the outer side of the piston therefore preferably has a rounded bottom.

With regard to strength, it is further preferred that the rib extends less far in the direction of the piston base than along the shaft. In particular, this provides a stable configuration of the shaft walls.

Weight-saving is further achieved by preferably providing a retaining groove for a retaining ring for a piston pin, said groove being discontinuous at at least one point along its circumference. Proceeding from a standard, circumferentially continuous retaining groove, the discontinuity of the same can be achieved by removing the material surrounding the retaining groove in places along the piston pin axis and in the direction of the piston interior in such a way that the retaining groove "disappears" in these regions and the retaining ring is, for example, only seated in a groove in an upper region facing the piston base and in a lower region. This seating creates an adequate wrap angle for the retaining ring and, in the described manner, simultaneously permits further weight-saving. The retaining groove can preferably be configured to be wider in its circumferential direction in the upper region, for example over 120 to 150 degrees and narrower at the underside, for example over 60 to 100 degrees. The discontinuities in the retaining groove offer the further advantage that no special removal groove is required for removing the retaining ring, since a removal tool can be positioned in the region of the discontinuity. This reduces production costs.

Finally, it is preferred that the shaft, when viewed from the underside of the piston, exhibits a convex curvature on the outer side, proceeding from the shaft walls, and a concave curvature at the transition to the piston pin hubs. Overall this produces a so-called "figure of eight" piston shape, which affords a wide shaft wall and an adequate safety margin of a cooling oil nozzle in the interior of the piston, as well as a piston pin of minimal length. Moreover, this permits an homogenous contact pattern on the shaft. At the same time, the shaft attachment to the connecting walls can be provided with greater flexibility and an undesirable "rail load" can be reduced. Overall this produces a modern piston architecture.

In the method according to the invention for producing a steel piston for an internal combustion engine, openings are formed between the ring zone and shaft and at least one rib is formed, which is central with respect to a length of a piston pin to be received. This allows the corresponding advantages of the above-mentioned pistons to be achieved. Furthermore, all the piston features mentioned above and below are applicable in the method according to the invention and vice versa.

Preferably at least one opening is formed by forming a groove from the outer side of the piston. This opening can already be provided in forged or cast pistons but, alternatively or additionally, it can be formed from the outer side by forming the groove, wherein it is necessary to ensure that the material in the region of the provided rib is sufficiently thick.

The rib is preferably provided during primary shaping, for example during casting or forging, or the piston is machined from its inner side by milling in a suitable manner to form the rib. Finally, the rib can also be formed in the context of rapid prototyping.

BRIEF DESCRIPTION OF THE DRAWINGS

An exemplary embodiment of the invention, which is shown in the drawings, is explained in more detail below. The figures show.

DETAILED DESCRIPTION OF A PREFERRED EMBODIMENT OF THE INVENTION

Figure 1:
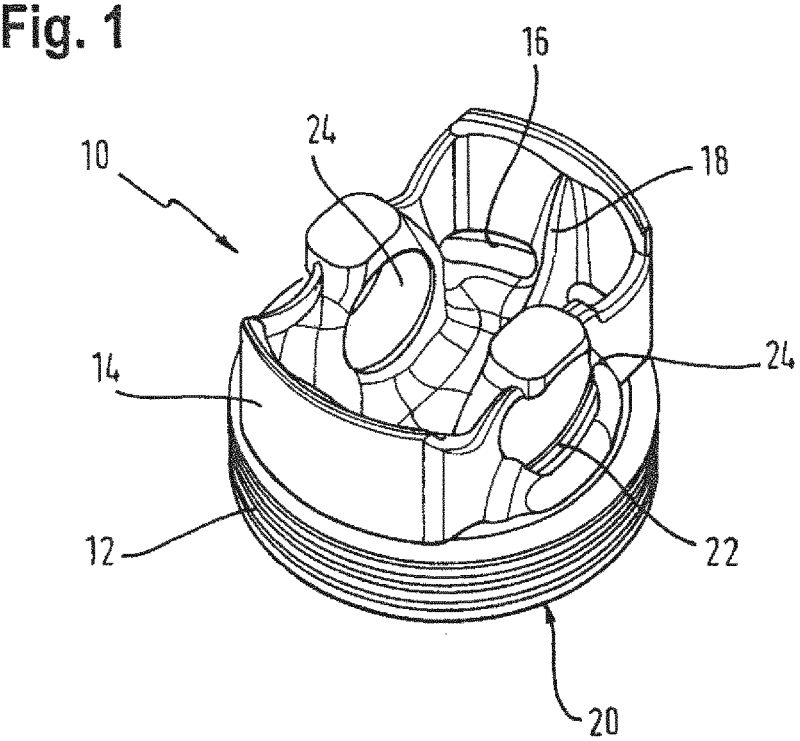
FIG. 1 a perspective bottom view of a piston according to the invention.

As can be seen in FIG. 1, the piston 10 illustrated in a bottom view in FIG. 1 comprises a ring zone 12 and a shaft 14, which is formed by two opposing shaft walls, which are connected by connecting walls, in which the piston pin hubs are provided. As can likewise be seen in FIG. 1, when viewed from the outside, proceeding from the respective shaft wall, the connecting walls are initially convexly curved and are concavely curved at the transition to the piston pin hubs.

A central rib 18, which can be seen on the right-hand side of the piston, is located along the extent of the piston pin (not shown), that is to say approximately in the centre between the shown piston pin hubs 24. In the illustrated embodiment, there is an opening to both the right and left of the rib 18, although only the left one is clearly visible in FIG. 1. The opening extends from the piston outer side to the piston inner side and can, for example, be formed in that a groove is formed from the outer side and the material thickness in the regions adjacent to the rib 18 is sufficiently thin to create the described openings 16. As can also be seen in FIG. 2, the upper and/or lower side of the groove leading to the opening, can be substantially perpendicular to the piston axis, and the bottom of the described groove, that is to say the outer side of the rib 18 and/or the regions 26 adjacent to the openings 16 can be concavely curved, when viewed from the outer side. This can also be seen in FIG. 2.

From FIG. 1, it can also be seen that the rib has a greater (radial) thickness in its centre, when viewed in the circumferential direction, than at its sides facing towards the openings 16. Moreover, in the illustrated exemplary embodiment, said rib extends less far on the underside of the piston base than along the respective shaft wall. FIG. 1 further shows the special configuration of a retaining groove 22 for a retaining ring for a piston pin. In particular, the material of the piston is so far removed at the sides of the piston pin that the retaining groove 22 "disappears" at this point and the retaining ring is only held by the remaining portions of the groove in the region of the upper and lower side. However, this is regarded as adequate and the described material recesses advantageously reduce the weight. Moreover, a removal tool can be used here so that advantageously no special removal groove is required. Finally, it can also be seen from FIG. 1 that, when viewed in a direction perpendicular to the piston axis and the piston pin axis, the openings exhibit rounded sides.

Figure 2:
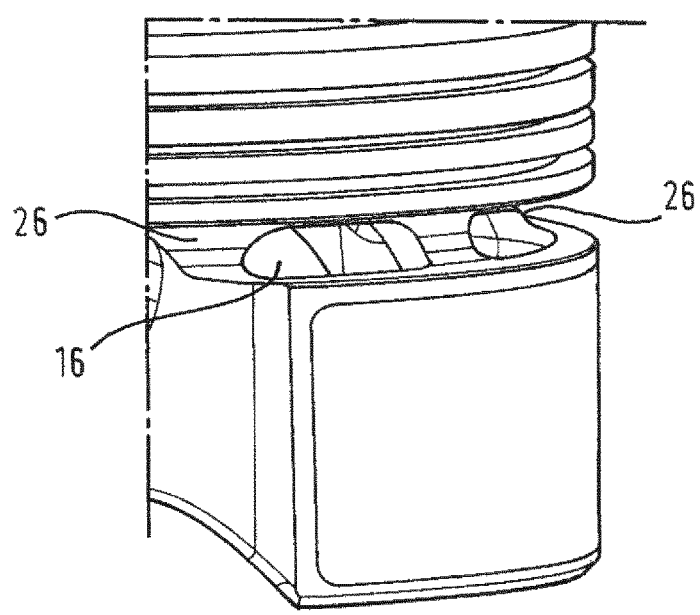
FIG. 2 a perspective side view of a portion of the piston according to the invention.

This additionally emerges from FIG. 2. It can also be seen in FIG. 2 that the respective shaft wall can have a substantially constant width along the piston axis and furthermore can have a coating, likewise preferably of constant width, along the piston axis.

The invention claimed is:

1. A steel piston for an internal combustion engine comprising a ring zone, a shaft, openings between the ring zone and shaft, which extend from the piston outer side to the piston inner side and, between two openings, a rib which is substantially central with respect to a length of a piston pin to be received,
wherein said rib has a radial thickness, when viewed in the circumferential direction, decreasing in a direction moving away from said ring zone, said rib has side portions which are concavely curved adjacent said openings, each side portion presents a side surface of one of said openings, and wherein said rib is forged.

2. The piston according to claim 1, wherein each opening exhibits more than double the width of the rib in the circumferential direction.

3. The piston according to claim 1, wherein the shaft exhibits at least 1.5× the height of the ring zone along the piston axis.

4. The piston according to claim 1, wherein the rib extends less far in the direction of a piston base than along the shaft.

5. The piston according to claim 1, further comprising at least one retaining groove for a retaining ring for a piston pin, said groove being discontinuous at least at one point along its circumference.

6. The piston according to claim 1, wherein when viewed from the underside of the piston, the shaft exhibits a convex curvature on the outer side proceeding from the shaft and a concave curvature at the transition to the piston pin bosses.

7. A method for producing a steel piston for an internal combustion engine comprising a ring zone and a shaft, wherein openings are formed between the ring zone and the shaft, said openings extending from the piston outer side to the piston inner side, and at least one rib, which is substantially central with respect to a length of a piston pin to be received, is formed between the openings,
wherein said rib has a radial thickness, when viewed in the circumferential direction, decreasing in a direction moving away from said ring zone, said rib has side portions which are concavely curved adjacent said openings, each side portion presents a side surface of one of said openings, and
wherein said at least one rib is formed by forging.

8. A method for producing a piston for an internal combustion engine according to claim 7, wherein the openings are formed by forming a groove running from the outer side of the piston.

* * * * *